US007012108B2

(12) United States Patent
Rätzsch et al.

(10) Patent No.: US 7,012,108 B2
(45) Date of Patent: Mar. 14, 2006

(54) MODIFIED INORGANIC PARTICLES

(75) Inventors: Manfred Rätzsch, Wilhering/Thalheim (AT); René Dicke, Linz (AT); Markus Machherndl, Leonding (AT); Gerd Granner, Pasching (AT)

(73) Assignee: Agrolinz Melamin GmbH, Linz (AT)

( * ) Notice: Subject to any disclaimer, the term of this patent is extended or adjusted under 35 U.S.C. 154(b) by 0 days.

(21) Appl. No.: 10/450,352

(22) PCT Filed: Dec. 12, 2001

(86) PCT No.: PCT/EP01/14583

§ 371 (c)(1),
(2), (4) Date: Nov. 14, 2003

(87) PCT Pub. No.: WO02/48248

PCT Pub. Date: Jun. 20, 2002

(65) Prior Publication Data

US 2004/0082697 A1    Apr. 29, 2004

(30) Foreign Application Priority Data

Dec. 15, 2000  (AT) .............................. A 2087/2000

(51) Int. Cl.
*C08K 9/04*   (2006.01)
*C08K 9/10*   (2006.01)
*C08K 3/34*   (2006.01)

(52) U.S. Cl. ...................... 523/205; 523/208; 523/209; 523/215; 524/445; 524/447; 524/448; 524/449; 524/451; 428/407

(58) Field of Classification Search ................ 523/205, 523/208–209, 216, 215; 524/445–449, 451–454; 428/407
See application file for complete search history.

(56) References Cited

U.S. PATENT DOCUMENTS

| 2,807,595 | A |   | 9/1957 | Brown |
| 3,912,532 | A | * | 10/1975 | Simone ...................... 523/216 |
| 4,334,971 | A |   | 6/1982 | Mahnke et al. |
| 4,472,538 | A | * | 9/1984 | Kamigaito et al. ......... 523/202 |
| 5,162,487 | A |   | 11/1992 | Weiser et al. |
| 5,866,645 | A |   | 2/1999 | Pinnavaia et al. |
| 5,955,535 | A |   | 9/1999 | Vaia et al. |
| 6,096,803 | A |   | 8/2000 | Pinnavaia et al. |
| 2004/0054034 | A1 | * | 3/2004 | Ratzsch et al. ............. 523/216 |

FOREIGN PATENT DOCUMENTS

| CA | 2000472 | 4/1990 |
| DE | 1054232 | 4/1959 |
| EP | 0 037 470 | 10/1981 |
| EP | 0 149 652 | 7/1985 |
| EP | 0 408 947 | 1/1991 |
| EP | 0 408 947 A2 | 1/1991 |
| EP | 0 484 245 A1 | 5/1992 |
| EP | 0 822 163 A2 | 2/1998 |
| EP | 1 038 834 A1 | 9/2000 |
| EP | 1 038 913 A1 | 9/2000 |
| JP | 52-33931 | 3/1977 |
| JP | 57-200454 | 12/1982 |
| JP | 58-217424 | 12/1983 |
| JP | 4-305005 | 10/1992 |
| JP | 4-335045 | 11/1992 |
| JP | 10-81808 | 3/1998 |
| JP | 11-323106 | 11/1999 |
| JP | 2000-191925 | 7/2000 |
| RU | 2 154 073 C1 | 8/2000 |
| WO | WO 93/04117 | 3/1993 |
| WO | WO95/14733 | 6/1995 |
| WO | WO96/20230 | 7/1996 |
| WO | WO 00/09571 | 2/2000 |
| WO | WO 00/09605 | 2/2000 |
| WO | WO 00/24818 | 5/2000 |
| WO | WO 00/44669 | 8/2000 |
| WO | WO00/49072 | 8/2000 |
| WO | WO 01/04205 A1 | 1/2001 |

OTHER PUBLICATIONS

International Search Report of PCT/EP01/14583, date Jun. 7, 2002.
International Preliminary Examination Report of PCT/EP01/14583, dated Sep. 4, 2002, and corresponding English translation.
DATABASE WPI, Section Ch, Week 199250, Derwent Publications Ltd., London, GB; AN 1992-409808, XP002199333.
DATABASE WPI, Section Ch, Week 197717, Derwent Publications Ltd., London, GB; AN 1977-29855Y, XP002199334.
Lagaly, "Clay minerals" (1981)16, pp. 1-21 (On Order).
Mülhaupt, "Kunststoffe [Plastics]" 87(1997)4, pp. 482-486 (On Order).
Gilman, "Flammability Studies Polymer Layered Silicate Na-nocomposites" 1999, pp. 249-265 (On Order).
Patent Abstract of Japan, Publication No. 52-033931, Published on Mar. 15, 1997, in the name of Furusawa Yonemasa, et al.
Patent Abstract of Japan, Publication No. 04-305005, Published on Oct. 28, 1992, in the name of Yoshioka Katsuaki, et al.

(Continued)

*Primary Examiner*—Peter Szekely
(74) *Attorney, Agent, or Firm*—Christie, Parker and Hale, LLP

(57) ABSTRACT

The invention relates to modified inorganic particles with a layer structure with an average particle diameter of 5 nm to 20000 nm, comprising an outer shell consisting of aminoplasts which contain, interlamellarly, multifunctional $C_1$–$C_{30}$ amino compounds of the melamine, melamine derivative, urea, urea derivative, guanidine, guanidine derivative, cyanamide, dicyandiamide, sulphonamide and/or aniline-type. The invention also relates to the production of said modified inorganic particles and to their use in thermoplastics and duroplastics.

23 Claims, No Drawings

OTHER PUBLICATIONS

Patent Abstract of Japan, Publication No. 11-323106, Published on Nov. 26, 1999, in the name of Suzuki Noriyuki.

Patent Abstract of Japan, Publication No. 2000-191925, Published on Jul. 11, 2000, in the name of Tsuda Takashi.

Lagaly, G., "Characterization of Clays By Organic Compounds", Clay minerals (1981) vol. 16, pp. 1-21.

Gilman, J.W., et al., "Flammability Studies of Polymer Layered Silicate Nanocomposites: Polyolefin, Epoxy, and Vinyl Ester Resins" Chemistry and Technology of Polymer Additives, Chapter 14, National Institue of Standards and Technology, 1999, pp. 249-265.

R. Mulhaupt et al, "PP-Compounds ALS Konstruktions—Werkstoffe", Kunststoffe 87 (1997), pp. 482-484, 486.

Woebcken, "Kunststoff-Handbuch (Plastics handbook)", vol. 10 of Duroplaste (Thermosetting Plastics), p. 267, Carl-Hanser-Verlap, Munich 1998 (partial English translation previously filed on Apr. 15, 2005).

Woebcken "Kunstsoff-Handbuch (Plastics handbook)" vol. 10 of Duroplaste (Thermosetting Plastics), p. 267, Carl-Hanser-Verlap, Munich 1998 (On Order).

Patent Abstracts of Japan for Publication No. 58-217424, publication date of Dec. 17, 1983, in the name of Shimazu Kosuke.

Patent Abstracts of Japan for Publication No. 04-335045, publication date of Nov. 24, 1992, in the name of Nakawa Takahiro et al.

Mulhaupt, R., et al, "PP-Compounds als Konstruktionswerkstoffe", Kunststoffe 87 (1997), pp. 482-486 (previously filed Jul. 25, 2003) partial English translation entitled "PP-Compounds as Engineering Materials".

Woebcken, "Kunststoff-Handbuch (Plastics handbook)", vol. 10 of Duroplaste (Thermosetting Plastics), p. 267, Carl-Hanser-Verlap, Munich 1998 (partial English Translation only).

* cited by examiner

MODIFIED INORGANIC PARTICLES

CROSS-REFERENCE TO RELATED APPLICATION

This application is a National Phase Patent Application of International Application Number PCT/EP01/14583, filed on Dec. 12, 2001, which claims priority of Austrian Patent Application Number A 2087/2000, filed on Dec. 15, 2000.

FIELD OF THE INVENTION

The invention relates to modified inorganic particles having a layer structure, a process for their preparation, and a method for their use.

BACKGROUND

Inorganic particles having a layer structure, such as clay minerals, and the modification thereof with dyes, polyhydric alcohols and alkylammonium ions are known [Lagaly, G., Clay minerals (1981)16, 1–21]. It is also known that inorganic particles having a layer structure can be used as plastics additives in elastomers (EP 0 484 245) and thermoplastics [Mülhaupt, R., Kunststoffe [Plastics] 87(1997)4, 482–486]. A disadvantage is the high degree of agglomeration of the layer-like clay minerals, so that it is not possible to distribute layer-like clay minerals in a finely divided form in thermoplastic melts.

Known solutions for dispersing layer-like clay minerals having particle sizes of from 1 to 500 nm in plastic melts are the addition of amine-substituted onium complexes (WO 93/04117) or the dispersing of phyllosilicates by dewatering and complexing with solutions of water-insoluble polymers (EP 0 822 163). However, these processes are very complicated, and low molecular weight compounds in the blends result in a decrease in the strength of the blends.

SUMMARY OF THE INVENTION

The present invention is generally directed to inorganic particles having a layer structure that have good dispersibility in plastics and result in an improvement in the property spectrum of thermoplastic and thermosetting plastics, in particular of polyolefins.

In one embodiment, the invention is directed to modified inorganic particles having a layer structure, modified inorganic particles having a mean particle diameter of from 5 nm to 20,000 nm and an outer coat of aminoplasts present in an amount of from 0.1 to 20% by mass, based on the mass of the anhydrous inorganic particles, and an interlamellar content of from 20 to 5,000% by mass, based on the mass of the anhydrous inorganic particles, of a mixture of from 50 to 98% by mass of one or more substantially polyfunctional $C_1$–$C_{80}$ amino compounds selected from melamine, melamine derivatives, urea, urea derivatives, guanidine, guanidine derivatives, cyanamide, dicyandiamide, sulfonamides, aniline and salts thereof and from 2 to 50% by mass of water.

Inorganic particles having a layer structure include, for example, silicates, phosphates, arsenates, titanates, vanadates, niobates, molybdates and/or manganates, in particular sheet silicates of the type consisting of montmorillonite, bentonite, kaolinite, muscovite, hectorite, fluorohectorite, canemite, revdite, grumantite, ilerite, saponite, beidelite, nontronite, stevensite, laponite, taneolite, vermiculite, halloysite, volkonskoite, magadite, rectorite, halloysite, kenyaite, sauconite, borofluorophlogopites and synthetic sheet silicates. The sheet silicates are preferably sheet silicates having exchangeable cations comprising alkali metal, alkaline earth metal, aluminum, iron and/or manganese cations.

Examples of suitable phosphates having a layer structure are compounds of the formula $H_2[M^{IV}(PO_4)_2]\cdot xH_2O$ ($M^{IV}$=Zr, Ti, Ge, SN, Pb) and $CaPO_4R\cdot H_2O$ (R=$CH_3$ or $C_2H_5$).

Examples of suitable arsenates having a layer structure are compounds of the formula $H_2[M^{IV}(AsO_4)_2]\cdot xH_2O$ and $H[Mn(AsO_4)_2]\cdot xH_2O$. Examples of suitable titanates having a layer structure are compounds of the formula $Na_4Ti_8O_{20}\cdot xH_2O$ and $K_2Ln_2Ti_3O_{10x}H_2O$.

Synthetic sheet silicates are obtained, for example, by reacting natural sheet silicates with sodium hexafluorosilicate.

Particularly preferred sheet silicates are those whose layers have an interlayer spacing of about 0.4 nm to 1.5 nm.

The aminoplasts of the outer coat of the modified inorganic particles according to the invention and having a layer structure are preferably selected from melamine resins, urea resins, cyanamide resins, dicyandiamide resins, sulfonamide resins, guanamine resins and/or aniline resins.

Preferred melamine resins include polycondensates of melamine or melamine derivatives and $C_1$–$C_{10}$-aldehydes having a molar melamine or melamine derivative to $C_1$–$C_{10}$-aldehydes ratio of from 1:1 to 1:6 and partial etherification products thereof with $C_1$–$C_{10}$-alcohols. Preferred melamine derivatives include melamines, diaminomethyltriazines and diaminophenyltriazines substituted by hydroxy-$C_1$–$C_{10}$-alkyl groups, hydroxy-$C_1$–$C_4$-alkyl(oxa-$C_2$–$C_4$-alkyl)$_{1-5}$ groups and/or by amino-$C_1$–$C_{12}$-alkyl groups, such as 2-(2-hydroxyethylamino)-4,6-diamino-1,3,5-triazine, 2-(5-hydroxy-3-oxapentylamino)-4,6-diamino-1,3,5-triazine and 2,4,6-tris(6-aminohexylamino)-1,3,5-triazine, ammeline, ammelide, melem, melon, melam, benzoguanamine, acetoguanamine, tetramethoxymethylbenzoguanamine, caprinoguanamine and butyroguanamine. The $C_1$–$C_{10}$-aldehyde is preferably formaldehyde, acetaldehyde, trimethylolacetaldehyde, acrolein, furfurol, glyoxal or glutaraldehyde, more preferably formaldehyde.

The melamine resins in the outer coat of the modified inorganic particles according to the invention and having a layer structure can likewise contain from 0.1 to 10% by mass, based on the total mass of melamine and melamine derivatives, of incorporated phenols and/or urea. Suitable phenol components include phenol, $C_1$–$C_9$-alkylphenols, hydroxyphenols and bisphenols.

Examples of partial etherification products of melamine resins with $C_1$–$C_{10}$-alcohols include methylated and butylated melamine resins.

Examples of urea resins optionally contained as aminoplasts in the outer coat of the modified inorganic particles according to the invention and having a layer structure include cocondensates with phenols, acid amides and sulfonamides, as well as urea/formaldehyde resins.

Examples of sulfonamide resins optionally contained as aminoplasts in the outer coat of the modified inorganic particles according to the invention and having a layer structure include sulfonamide resins obtained from p-toluenesulfonamide and formaldehyde.

Examples of guanamine resins optionally contained as aminoplasts in the outer coat of the modified inorganic particles according to the invention and having a layer structure include resins that contain benzoguanamine, acetoguanamine, tetramethoxymethylbenzoguanamine, caprinoguanamine and/or butyroguanamine as guanamine components.

Examples of aniline resins optionally contained as aminoplasts in the outer coat of the modified inorganic particles according to the invention and having a layer structure include aniline resins that, in addition to aniline, may also contain toluidine and/or xylidines as aromatic diamines. The melamine derivatives optionally forming the interlamellar content in the modified inorganic particles according to the invention and having a layer structure are preferably selected from melamines, diaminomethyltriazines and/or diaminophenyltriazines substituted by hydroxy-$C_1$–$C_{10}$-alkyl groups, hydroxy-$C_1$–$C_{10}$-alkyl(oxa-$C_2$–$C_4$-alkyl)$_{1-5}$ groups and/or by amino-$C_1$–$C_{12}$-alkyl groups, such as 2-(2-hydroxyethylamino)-4,6-diamino-1,3,5-triazine, 2-(5-hydroxy-3-oxapentylamino)-4,6-diamino-1,3,5-triazine, 2,4,6-tris(6-aminohexylamino)-1,3,5-triazine and/or 2,4-(di-5-hydroxy-3-oxapentylamino)-6-methyl-1,3,5-triazine, ammeline, ammelide, melem, melon and/or melam.

The urea derivatives optionally forming the interlamellar content in the modified inorganic particles according to the invention and having a layer structure include thiourea, urea, and thiourea substituted with one or more $C_1$–$C_{10}$-alkyl groups, $C_6$–$C_{14}$-aryl groups, hydroxy-$C_1$–$C_{10}$-alkyl groups, hydroxy-$C_1$–$C_4$-alkyl (oxa-$C_2$–$C_4$-alkyl) 1-5 groups and/or by amino-$C_1$–$C_{12}$-alkyl groups.

The salts of melamine, melamine derivatives, urea, urea derivatives, guanidine, guanidine derivatives, cyanamide, dicyandiamide, sulfonamides and/or aniline which optionally form the interlamellar content in the modified inorganic particles according to the invention and having a layer structure are preferably salts having inorganic and/or organic anions, such as fluorides, chlorides, bromides, iodides, sulfates, phosphates, borates, silicates, cyanurates, tosylates, formates, acetates, propionates, butyrates and/or maleates.

The modified inorganic particles having a layer structure may be prepared, in accordance with the invention, by a process in which suspensions of inorganic particles having a layer structure in water or mixtures of from 5 to 99% by weight of water and from 1 to 95% by mass of $C_1$–$C_8$-alcohols, having a solids content of from 2 to 35% by mass, are homogenized, in a stirred reactor at 20 to 100° C. and with a residence time of from 10 to 180 min, with solutions or suspensions of polyfunctional $C_1$–$C_{30}$ amino compounds selected from melamine, melamine derivatives, urea, urea derivatives, guanidine, guanidine derivatives, cyanamide, dicyandiamide, sulfonamides and aniline and salts thereof in water or mixtures of from 5 to 99% by weight of water and from 1 to 95% by mass of $C_1$–$C_8$-alcohols, having a solids content of from 5 to 90% by mass, the amount by mass of the polyfunctional $C_1$–$C_{30}$ amino compounds being from 20 to 5000% by mass, based on the anhydrous inorganic particles. Following the dispersion of the laden inorganic particles, optionally after the liquid phase has been partially separated off, aminoplast prepolymers selected from melamine resins, urea resins, cyanamide resins, dicyandiamide resins, sulfonamide resins, guanamine resins and/or aniline resins having a number average molar mass of from 150 to 1000 are introduced as a solution in water and/or in organic solvents or solvent mixtures, having a resin content of from 30 to 98% by mass. Optionally acidic catalysts in an amount of 0.1 to 2.0% by mass, based on the mass of the aminoplast prepolymers, are introduced at a temperature of 20 to 90° C. and are reacted. The aminoplast content of the dispersion is from 0.1 to 20% by mass, based on the mass of the anhydrous inorganic particles. The solids content of inorganic particles in the dispersion is from 0.5 to 35% by mass, and the residence time is from 10 to 45 min. Thereafter the modified inorganic particles are dried at a temperature of 20 to 180° C. and for a residence time of from 0.1 to 8 hours with removal of the liquid phase.

A further process for the preparation of the modified inorganic particles having a layer structure according to the invention comprises homogenizing suspensions of inorganic particles having a layer structure in water or mixtures of from 5 to 99% by weight of water and from 1 to 95% by mass of $C_1$–$C_8$-alcohols, having a solids content of from 2 to 35% by mass, in a stirred reactor at a temperature of 20 to 100° C. and for a residence time of from 10 to 180 min, with solutions or suspensions of polyfunctional $C_1$–$C_{30}$ amino compounds selected from melamine, melamine derivatives, urea, urea derivatives, cyanamide, dicyandiamide, sulfonamides guanidine, guanidine derivatives, aniline and salts thereof in water or mixtures of from 5 to 99% by weight of water and from 1 to 95% by mass of $C_1$–$C_8$-alcohols, having a solids content of from 5 to 90% by mass. The amount of the one or more polyfunctional $C_1$–$C_{30}$ amino compounds is from 20 to 5000% by mass, based on the mass of the anhydrous inorganic particles. Following the dispersion of the laden inorganic particles, optionally after the liquid phase has been partially separated off, one or more $C_1$–$C_{10}$-aldehydes in an amount of 0.1 to 10% by mass, based on the mass of the anhydrous inorganic particles, are added as 5 to 50% solutions in water or mixtures of from 5 to 99% by weight of water and from 1 to 95% by mass of $C_1$–$C_8$-alcohols, which optionally contain from 0.05 to 1.0% by mass, based on the mass of the one or more $C_1$–$C_{10}$-aldehydes, of acidic catalysts, over 10 to 90 min at a temperature of 50 to 90° C. Thereafter, the modified inorganic particles are dried at a temperature of 20 to 180° C. and for a residence time of from 0.1 to 8 hours with removal of the liquid phase.

The one or more $C_1$–$C_{10}$-aldehydes used in the preparation of the modified inorganic particles are preferably selected from formaldehyde, acetaldehyde, trimethylolacetaldehyde, acrolein, benzaldehyde, furfurol, glyoxal, glutaraldehyde, phthalaldehyde and terephthalaldehyde, and particularly preferably is formaldehyde.

Examples of suitable acidic catalysts for use in the process according to the invention for the preparation of modified inorganic particles having a layer structure are inorganic acids, such as hydrochloric acid and sulfuric acid, and organic acids, such as formic acid, acetic acid, oxalic acid, p-toluenesulfonic acid and lactic acid. Acids having a buffer function, such as citric acid, acetic acid and phosphoric acid, and acidic salts having a buffer function, such as sodium hydrogen phosphate and potassium hydrogen phosphate, are preferred.

The modified inorganic particles are particularly suitable for flameproofing plastics, preferably in combination with inorganic and/or organic salts having ammonium, alkylammonium, arylammonium, phosphonium, alkylphosphonium, arylphosphonium, alkali metal and/or alkaline earth metal cations and/or phosphate, phosphite, phosphonate, silicate and/or borate anions and/or with polyhydric alcohols such as erythritol, pentaerythritol, pentitol and/or hexitol. The modified inorganic particles of the invention are also useful as additives for increasing the scratch resistance and UV stability and for improving the barrier properties of plastics and plastics laminates, and as a catalyst or catalyst support.

When the modified inorganic particles are used as a plastic additive, it is advantageous to add from 0.1 to 5% by mass, based on the mass of the modified inorganic particles, of one or more water-soluble, water-dispersible and/or water-emulsifiable polymers, such as polyvinyl alcohol, polyvinyl acetate, maleic anhydride copolymers and/or saturated or unsaturated polyesters, to the modified inorganic particles.

When a modified inorganic particle is used as an additive for flameproofing plastic, particularly preferred combinations are those that contain ammonium polyphosphate and pentaerythritol.

Further polyolefins according to the invention include those having a content of from 1 to 60% by mass, based on the mass of the polyolefin used, of modified inorganic particles having a layer structure and optionally, as further additives, inorganic or organic salts, fillers, reinforcing materials, polymeric dispersants, assistants and/or polyhydric alcohols. It is possible for the inorganic or organic salts to be salts having ammonium, alkylammonium, phosphonium, alkylphosphonium, arylphosphonium, alkali metal and/or alkaline earth metal cations and/or salts having phosphite, phosphate, phosphonate, silicate and/or borate anions, which may be present in the polyolefin in an amount of up to 25% by mass. The fillers and/or reinforcing materials may be inorganic or organic fillers and/or fibers, which may be present in the polyolefin in an amount of up to 40% by mass. The polymeric dispersants may be water-soluble, water-dispersible and/or water-emulsifiable polymers that may be presented in the polyolefin in an amount of up to 3% by mass. The polyhydric alcohols may be polyhydric alcohols such as erythritol, pentaerythritol, pentitol and/or hexitol, which may be present in the polyolefin in an amount of up to 15% by mass.

The amount of the modified inorganic particles having a layer structure is preferably from 3 to 30% by mass, based on the mass of the polyolefin.

The polyolefins according to the invention, containing modified inorganic particles having a layer structure and optionally further additives, have an improved property spectrum with respect to the degree of flameproofing, toughness, scratch resistance, UV stability and barrier properties.

The polyolefins according to the invention, containing modified inorganic particles having a layer structure and optionally further additives, are preferably poly-$C_2$–$C_5$-α-olefins or copolymers of $C_2$–$C_5$-α-olefins and α-olefins having 2 to 18 C atoms of the type comprising linear and/or branched polyethylene homo- and/or copolymers, cycloolefin/ethylene copolymers, polypropylene homopolymers, random propylene copolymers, propylene block copolymers, random propylene block copolymers, isotactic polybut-1-ene and/or 4-methylpent-1-ene homo- and/or copolymers.

$Al_2O_3$, $Al(OH)_3$, barium sulfate, calcium carbonate, glass beads, silica, mica, quartz powder, slate powder, hollow microspheres, carbon black, talc, crushed rock, woodmeal and/or cellulose powder may be present in the polyolefins as fillers.

Examples of reinforcing materials in the polyolefins according to the invention, containing modified inorganic particles having a layer structure and optionally further additives, are wood fibers, cellulose fibers, flax, jute and kenaf.

Preferred reinforcing materials which may be contained in the polyolefins according to the invention, containing modified inorganic particles having a layer structure and optionally further additives, are inorganic fibers, in particular glass fibers and/or carbon fibers, natural fibers, in particular cellulose fibers, and/or plastic fibers, in particular fibers of polyacrylonitrile, polyvinyl alcohol, polyvinyl acetate, polypropylene, polyesters and/or polyamides.

Water-soluble, water-dispersible and/or water-emulsifiable polymers may be present as polymeric dispersants in the polyolefins according to the invention, containing modified inorganic particles having a layer structure and optionally further additives.

Examples of water-soluble polymers which may be contained in the polyolefins according to the invention, containing modified inorganic particles having a layer structure and optionally further additives, are polyvinyl alcohol, polyacrylamide, polyvinylpyrrolidone, polyethylene oxide, methylcellulose, ethylcellulose, hydroxyethylcellulose and/or carboxymethylcellulose.

The water-dispersible or water-emulsifiable polymers optionally contained in the polyolefins according to the invention, containing modified inorganic particles having a layer structure and optionally further additives, are thermoplastics, elastomers and/or waxes.

Examples of suitable thermoplastics are cellulose esters, cellulose ethers, polyvinyl acetate, polyvinyl propionate, polyacrylates, unsaturated and saturated polyesters, maleic anhydride copolymers, polypropylene oxide and/or ethylene/vinyl acetate copolymers. Preferred maleic anhydride copolymers are copolymers in which the anhydride groups have been modified by amidation and/or imidation with hydrophobic hydrocarbon substituents or esterification with hydrophilic polyalkylene oxide substituents.

Examples of water-dispersible and water-emulsifiable elastomers are styrene/butadiene rubbers, acrylate rubbers, polyurethanes and fluoroelastomers.

Examples of suitable waxes are polyolefin wax oxidates, such as polyethylene wax oxidates, and waxes based on ethylene/vinyl acetate copolymers.

Particularly preferred polymeric dispersants which are optionally contained in the polyolefins according to the invention, containing modified inorganic particles having a layer structure and optionally further additives, are polyvinyl alcohol, polyvinyl acetate, maleic anhydride copolymers and unsaturated and saturated polyesters.

The polyolefins according to the invention, containing modified inorganic particles having a layer structure and optionally further additives, can be prepared by a process in which mixtures of polyolefins, modified inorganic particles and optionally, as further additives, inorganic or organic salts, fillers, reinforcing materials, polymeric dispersants in the form of solutions, dispersions or emulsions, assistants and/or polyhydric alcohols are melted in continuous kneaders, or in which polyolefins are melted in continuous kneaders and the modified inorganic particles and optionally inorganic or organic salts, fillers, reinforcing materials, polymeric dispersants in the form of solutions, dispersions or emulsions and/or polyhydric alcohols are metered into the polymer melt. The mixtures are homogenized at a melt temperatures of from 30 to 100 degrees above the melting point or softening point of the polyolefins, optionally degassed in vacuo, discharged and granulated, or molded directly from the melt to give semifinished products or moldings. The content of modified inorganic particles having a layer structure and optionally, as further additives, inorganic or organic salts, fillers, reinforcing materials, polymeric dispersants, assistants and/or polyhydric alcohols in the polyolefins is from 1 to 60% by mass, based on the mass of the polyolefins used.

Continuous kneaders used in the preparation of the polyolefins according to the invention, containing modified inorganic particles having a layer structure and optionally further additives, are preferably twin-screw extruders having an L/D of from 30 to 48 or single-screw extruders having a plunger screw.

In the preparation, from 0.01 to 2.5% by mass of stabilizers, from 0.1 to 1% by mass of antistatic agents and/or from 0.01 to 5% by mass of processing assistants, based in each case on the polyolefins used, can be added as assistants.

Suitable stabilizers are preferably mixtures of from 0.01 to 0.6% by mass of phenolic antioxidants, from 0.01 to 0.6% by mass of 3-arylbenzofuranones, from 0.01 to 0.6% by mass of processing stabilizers based on phosphites, from 0.01 to 0.6% by mass of high temperature stabilizers based on disulfides and thioethers and/or from 0.01 to 0.8% by mass of sterically hindered amines (HALS).

Processing assistants which may be added in the preparation of the polyolefins according to the invention, containing modified inorganic particles having a layer structure and optionally further additives, are calcium stearate, magnesium stearate and/or waxes.

The polyolefins or olefin copolymers used in the preparation of the polyolefins according to the invention, containing modified inorganic particles having a layer structure and optionally further additives, preferably contain from 0.05 to 2% by mass, based on the polyolefins used, of olefin copolymers and/or olefin graft copolymers containing acid, acid anhydride and/or epoxide groups, preferably ethylene/butyl acrylate/acrylic acid terpolymers having an acrylic acid content of from 0.1 to 2% by mass or maleic anhydride-grafted polypropylene having a maleic anhydride content of from 0.05 to 0.5% by mass, as a compatibilizer for the modified inorganic particles having a layer structure and the inorganic or organic salts and/or polyhydric alcohols. The olefin graft copolymers can be prepared by customary processes, by reacting the polyolefin with the unsaturated monomer in the presence of thermal free radical initiators in the solid phase or in the melt.

The polyolefins according to the invention, containing modified inorganic particles having a layer structure and optionally further additives, have an improved property spectrum, in particular a good degree of flameproofing. They are particularly useful as films, fibers, sheets, pipes, coatings, hollow bodies, injection molded products and foams. The particular advantage of these semifinished products and moldings is the improved degree of flameproofing, toughness, scratch resistance and UV stability and the improved barrier properties.

Thermosetting plastics containing from 2 to 80% by mass, based on the mass of the thermosetting plastics used, of modified inorganic particles having a layer structure and optionally, as further additives, inorganic or organic salts, fillers, reinforcing materials, polymeric dispersants, assistants and/or polyhydric alcohols are furthermore according to the invention, the inorganic or organic salts being salts having ammonium, alkylammonium, phosphonium, alkylphosphonium, arylphosphonium, alkali metal and/or alkaline earth metal cations and/or salts having phosphite, phosphate, phosphonate, silicate and/or borate anions, which may be contained in an amount of up to 60% by mass in the thermosetting plastics, the fillers and/or reinforcing materials being inorganic or organic fillers and/or fibers, which may be contained in an amount of up to 70% by mass in the thermosetting plastics, the polymeric dispersants being water-soluble, water-dispersible and/or water-emulsifiable polymers which may be contained in an amount of up to 5% by mass in the thermosetting plastics, and the polyhydric alcohols being polyhydric alcohols such as erythritol, pentaerythritol, pentitol and/or hexitol, which are contained in an amount of up to 30% by mass in the thermosetting plastics.

The thermosetting plastics preferably contain from 5 to 50% by mass of modified inorganic particles, based on the thermosetting plastics.

Examples of thermosetting plastics are melamine resins, urea resins, guanamine resins, cyanamide resins, dicyandiamide resins, sulfonamide resins and aniline resins.

The thermosetting plastics may comprise aminoplasts of the same composition which may be a component of the outer coat of the modified inorganic particles.

The further additives optionally contained in the thermosetting plastics containing modified inorganic particles having a layer structure may be additives which may also be contained in the polyolefins containing modified inorganic particles having a layer structure and optionally further additives.

The thermosetting plastics according to the invention, containing modified inorganic particles having a layer structure and optionally further additives, are prepared by a process in which mixtures of precondensates of thermosetting plastics, modified inorganic particles having a layer structure and optionally, as further additives, inorganic or organic salts, fillers, reinforcing materials, polymeric dispersants in the form of solutions, dispersions or emulsions, assistants and/or polyhydric alcohols are molded by customary processes to give semifinished products or moldings and are cured. The content of modified inorganic particles having a layer structure and optionally, as further additives, inorganic or organic salts, fillers, reinforcing materials, polymeric dispersants, assistants and/or polyhydric alcohols in the blends is from 1 to 80% by mass, based on the mass of the thermosetting plastics used. The inorganic or organic salts are salts having ammonium, alkylammonium, phosphonium, alkylphosphonium, arylphosphonium, alkali metal and/or alkaline earth metal cations and/or salts having phosphite, phosphate, polyphosphates, phosphonates, silicate and/or borate anions, which may be contained in an amount of up to 45% by mass in the thermosetting plastic. The fillers and/or reinforcing material are inorganic or organic fillers and/or fibers which may be contained in an amount of up to 60% by mass in the thermosetting plastic. The polymeric dispersants are water-soluble, water-dispersible and/or water-emulsifiable polymers which may be contained in an amount of up to 5% by mass in the thermosetting plastic. The polyhydric alcohols are polyhydric alcohols such as erythritol, pentaerythritol, pentitol and/or hexitol, which may be contained in an amount of up to 15% by mass in the thermosetting plastic.

A preferred variant for the preparation of thermosetting plastics according to the invention, containing modified inorganic particles having a layer structure and optionally further additives, comprises preparing the precondensates of the thermosetting plastics by polycondensation of the monomers on which the precondensates of the thermosetting plastics are based, in the presence of the modified inorganic particles having a layer structure and optionally, as further additives, inorganic or organic salts, fillers, reinforcing materials, assistants polymeric dispersants and/or polyhydric alcohols.

The water-soluble, water-dispersible and/or water-emulsifiable polymers optionally contained, as polymeric dispersants, in the thermosetting plastics according to the invention, containing modified inorganic particles having a layer structure and optionally further additives, can likewise be formed in situ in the preparation of the thermosetting plastics, by adding to the mixtures present as aqueous dispersions or emulsions and comprising precondensates of aminoplasts and modified inorganic particles having a layer structure, before the preparation of the thermosetting plastics, instead of polymeric dispersants, mixtures of ethylenically unsaturated monomers and thermal free radical initiators, from which the water-soluble, water-dispersible and/or water-emulsifiable polymers are formed. Examples of suitable ethylenically unsaturated monomers are acrylamide, vinylpyrrolidone, $C_4$–$C_{18}$-(meth) acrylic esters and vinyl acetate.

Preferred semifinished products and moldings of polyolefins or thermosetting plastics containing modified inorganic particles having a layer structure and optionally further additives are films, prepregs, fibers, sheets, pipes, coatings, hollow bodies, injection molded products and foams.

The semifinished products and moldings according to the invention, comprising polyolefins containing modified inorganic particles having a layer structure and optionally further additives, can be prepared by customary methods for processing thermoplastics, poly-$C_2$–$C_5$-α-olefins or copolymers of $C_2$–$C_5$-α-olefins and α-olefins having 2 to 18 C atoms, containing modified inorganic particles having a layer structure and optionally, as further additives, inorganic or organic salts, fillers, reinforcing materials, polymeric dispersants, assistants and/or polyhydric alcohols being melted in continuous kneaders, preferably in extruders having an L/D of from 30 to 48, at temperatures of from 30 to 120° C. above the melting points or softening points of the polyolefins, homogenized, and A) discharged via an annular die, taken off as a blown film by forcing in air and rolled up, or B) discharged via a slot die, applied to a chill roll unit and taken off as a cover film and rolled up or, in the case of chill roll units having a plurality of slot dies, taken off as a coextrusion film and rolled up, or C) added as a melt to a roll mill and then to a calender and taken off as thermoformed film and rolled up or sealed on continuous sheets of metal foils, plastics films, paper webs or textile webs and taken off as multicomponent laminates and rolled up, or D) added as a melt to a calender and taken off as a thermoformed film and rolled up, taken off as a sheet via conveyor belts and cut or sealed on continuous sheets of metal foils, plastic films, paper webs or textile webs and taken off as multicomponent laminates and rolled up, or E) discharged via a profiled die and taken off as a profile, cut and fabricated, or F) discharged via an annular die, taken off as a tube by forcing in air and rolled up or taken off as a pipe, cut and fabricated, or G) discharged via a slot die after metering in blowing agents or discharged via an annular die by forcing in air and taken off as a foam sheet and rolled up or discharged via a circular die, taken off as an extrudate and cut into particle foam segments, or H) discharged via a slot die of a pipe coating unit and sealed in molten form on the rotating pipe, or I) discharged via an annular die with prior introduction of the conductors or of the made-up single cable and taken off as a single cable or as made-up single cables provided with a cable sheath and rolled up, or K) extruded through annular dies as a parison, shaped by blowing out in a heated divided blow mold for hollow bodies and optionally being subjected, in a second blow mold, to additional longitudinal stretching by means of a stretching plunger, a further radial stretching by means of blown air, or L) injected into a heated injection mold for the production of the parison and, after removal, optionally preferably separate heating of the parison in a conditioning mold, transferred to the blow mold and shaped by blowing out to give a hollow body, or M) processed in injection molding machines, preferably with three-zone screws having a screw length of from 18 to 24 D, and high injection speeds and at mold temperatures of from 5 to 70° C., to give injection molded articles, or N) melted in melt spinning units comprising plastifying extruder, melt pump, melt distributor, capillary mold, blow shaft and downstream apparatuses and extruded by means of the melt pump through the capillary mold into the blow shaft and taken off as filaments and further processed in downstream apparatuses.

Suitable processes for the production of semifinished products and moldings from mixtures of precondensates of thermosetting plastics, modified inorganic particles having a layer structure and optionally further additives to give semifinished products and moldings are formulations to give molding materials and thermoprocessing to give compression moldings, injection moldings, filaments or profiles by compression molding, injection molding, melt spinning or extrusion, or processing of solutions of the precondensates of thermosetting plastics, which precondensates contain the modified inorganic particles having a layer structure in dispersed form, to give thermosetting plastics fibers by centrifugal spinning, filament drawing, extrusion or fibrillation processes, optionally subsequent orientation, and curing, or processing of solutions of the precondensates of thermosetting plastics, which precondensates contain the modified inorganic particles having a layer structure in dispersed form, to give microcapsules by introduction into an emulsifier-free aqueous dispersion of solid or liquid capsule core formers, curing and spray-drying, or processing of solutions of the precondensates of thermosetting plastics, which precondensates contain the modified inorganic particles having a layer structure in dispersed form, to give closed-cell foams by introduction into an emulsifier-free aqueous dispersion of volatile hydrocarbons, inert gases and/or inorganic carbonates, and discharge of hollow particles either into molds and curing to give closed-cell foams or through a mold and curing to give closed-cell foamed profiles, or processing of solutions of the precondensates of thermosetting plastics, which precondensates contain the modified inorganic particles having a layer structure in dispersed form, to give open-cell foams by introduction into an aqueous blowing agent emulsion of volatile hydrocarbons, inert gases and/or inorganic carbonates, heating to the boiling point or decomposition point of the blowing agent and discharge either into molds and curing to give open-cell foams or through a mold and curing to give open-cell foamed profiles, or production of coatings by formulation of solutions of the precondensates of the thermosetting plastics, which precondensates contain the modified inorganic particles having a layer structure in dispersed form, to give coating resin solutions or coating resin dispersions and subsequent discharge of coating resin solutions or coating resin dispersions onto sheet-like substrate materials, drying and curing, or production of laminates by formulation of solutions of the precondensates of thermosetting plastics, which precondensates contain the modified inorganic particles having a layer structure in dispersed form, to give impregnating resin solutions or impregnating resin dispersions and subsequent impregnation of sheet-like substrate materials, lamination and curing, or processing of precondensates of thermosetting plastics, which precondensates contain the modified inorganic particles having a layer structure in dispersed form, by the casting resin technology to give semifinished products, moldings or coatings.

EXAMPLE 1

In a 20 l stirred reactor having a bottom drain valve, a mixture of 600 g of melamine, 600 g of sodium montmorillonite (Südchemie A G, Moosburg, Federal Republic of Germany) and 12 l of water is heated to 80° C. and stirred for 2 hours, the sodium montmorillonite swelling. The suspension is adjusted to pH=5.0 with 115 g of HCl and, after stirring for 1 hour at 80° C., 360 ml of formaldehyde (30%) are added in the course of 30 min. After stirring for 2 hours at 80° C., the modified inorganic particles are separated off in a cellular filter, washed chloride-free and dried in vacuo at 75° C./8 hours. The yield of modified sodium montmorillonite is 1200 g.

The primary particles of the modified sodium montmorillonite have a mean particle diameter of 150 nm, determined by transmission electron microscopy.

ATR investigations of the modified inorganic particle indicated a surface coating of the particles with melamine/formaldehyde resin.

For determining the content of free intercalated melamine in the intermediate silicate layers, 12 g of the modified inorganic particles having a layer structure were extracted for 48 hours with water. After concentration of the extract and vacuum drying, 5.2 g of a white powder were obtained. The dissolution in water and fractionation by means of HPLC (Waters HPLC 2690, UV detection at 220 nm, Develosil RP aquaeus column 5 mcm 250×2 mm, elution by 0.05 M $NaH_2PO_4$/acetonitrile (solvent gradient) gave the following composition, based on the amount of melamine starting material: 68% by mass of melamine and 32% by mass of hydroxymethylolmelamine and higher molecular weight oligomers.

EXAMPLE 2

In a 20 l stirred reactor having a bottom drain valve, a mixture of 500 g of melamine, 50 g of urea, 50 g of thiourea, 600 g of calcium montmorillonite (Südchemie A G, Moosburg, Federal Republic of Germany) and 12 l of water is heated to 80° C. and stirred for 2 hours, the calcium montmorillonite swelling. The suspension is adjusted to about pH=5.0 with 115 g of HCl and, after stirring for 1 hour at 80° C., 450 ml of a mixture of formaldehyde (30%) and glutaraldehyde (50%), molar ratio 4:1, are added in the course of 30 min. After stirring for 2 hours at 80° C., the modified inorganic particles are separated off in a cellular filter, washed chloride-free and dried in vacuo at 75° C./8 hours. The yield of modified calcium montmorillonite is 1150 g.

The primary particles of the modified calcium montmorillonite have a mean particle diameter of 650 nm, determined by transmission electron microscopy.

ATR investigations of the modified inorganic particle indicated a surface coating of the particles with aminoplast.

For determining the content of free intercalated polyfunctional amino compounds in the intermediate silicate layers, 12 g of the modified inorganic particles having a layer structure were extracted for 48 hours with water. After concentration of the extract and vacuum drying, 5.0 g of a white powder were obtained. The dissolution in water and fractionation by means of HPLC (Waters HPLC 2690, UV detection at 220 nm, Develosil RP aquaeus column 5 mcm 250×2 mm, elution by 0.05 M $NaH_2PO_4$/acetonitrile (solvent gradient)) gave the following composition, based on the amount of starting materials in the form of polyfunctional amino compounds: 60% by mass of melamine, 6% by mass of urea, 6% by mass of thiourea, 28% by mass of methylolated polyfunctional amino compounds and higher molecular weight oligomers.

EXAMPLE 3

5 kg of 30% aqueous formalin solution and 1.74 kg of melamine are introduced into a 10 l stirred reactor and condensed at 80° C. with stirring in the course of 120 min.

In a second 200 l stirred reactor having a turbo stirrer, a mixture of 6 kg of melamine, 6 kg of sodium montmorillonite (Südchemie A G, Moosburg, Federal Republic of Germany) and 120 l of water is heated to 80° C. and stirred for 2 hours, the sodium montmorillonite swelling. The suspension is adjusted to pH=5.0 with 1.15 kg of HCl and stirring is effected for 1 hour at 80° C. After cooling to room temperature, an aqueous solution of the aminoplast precondensate is added to the stirred dispersion in the course of 30 min at high mixing intensity (40 m/s). After a reaction time of 60 min, the dispersion is discharged and the modified inorganic particles are separated off in a cellular filter, washed chloride-free and dried in vacuo at 75° C./8 hours. The yield of modified sodium montmorillonite is 13.4 kg.

The primary particles of modified sodium montmorillonite have a mean particle diameter of 950 nm, determined by transmission electron microscopy.

ATR investigations of the modified inorganic particles indicated a surface coating of the particles with melamine resin.

For determining the content of free intercalated melamine in the intermediate silicate layers, 12 g of the modified inorganic particles having a layer structure were extracted for 48 hours with water. After concentration of the extract and vacuum drying, 5.6 g of a white powder were obtained. The dissolution in water and fractionation by means of HPLC (Waters HPLC 2690, UV detection at 220 nm, Develosil RP aquaeus column 5 mcm 250×2 mm, elution by 0.05 M $NaH_2PO_4$/acetonitrile (solvent gradient) gave the following composition, based on the amount of melamine starting material: 71% by mass of melamine and 29% by mass of hydroxymethylolmelamine and higher molecular weight oligomers.

EXAMPLE 4

5.4 kg of 30% aqueous formalin solution, 1.3 kg of water and 4.0 kg of melamine are introduced into a 20 l stirred reactor and condensed at 80° C. with stirring over 120 min.

In a second 200 l stirred reactor having a turbo stirrer, a mixture of 6 kg of melamine, 6 kg of sodium montmorillonite (Südchemie A G, Moosburg, Federal Republic of Germany) and 120 l of water is heated to 80° C. and stirred for 2 hours, the sodium montmorillonite swelling. The suspension is adjusted to pH=5.0 with 1.15 kg of HCl and stirring is effected for 1 hour at 80° C. After cooling to room temperature, an aqueous solution of the aminoplast precondensate is added to the stirred dispersion over 30 min at high mixing intensity (40 m/s). After a reaction time of 60 min, the dispersion is discharged and the modified inorganic particles are separated off in a cellular filter, washed chloride-free and dried in vacuo at 75° C./8 hours.

The yield of modified sodium montmorillonite is 17.1 kg. The primary particles of modified sodium montmorillonite have a mean particle diameter of 650 nm, determined by transmission electron microscopy.

ATR investigations of the modified inorganic particles indicated a surface coating of the particles with melamine resin.

For determining the content of free intercalated melamine in the intermediate silicate layers, 12 g of the modified inorganic particles having a layer structure were extracted for 48 hours with water. After concentration of the extract and vacuum drying, 5.6 g of a white powder were obtained. The dissolution in water and fractionation by means of HPLC (Waters HPLC 2690, UV detection at 220 nm, Develosil RP aquaeus column 5 mcm 250×2 mm, elution by 0.05 M $NaH_2PO_4$/acetonitrile (solvent gradient)) gave the following composition, based on the amount of melamine starting material: 69% by mass of melamine and 31% by mass of hydroxymethylolmelamine and higher molecular weight oligomers.

EXAMPLE 5

A mixture of propylene copolymer (melt flow index 16.0 g/10 min at 230° C./2.16 kg, ethylene content 4.8% by mass) with 20% by mass of ammonium polyphosphate, 5% by mass of pentaerythritol, 0.15% by mass of 2-tert-butyl-4,6-diisopropylphenol, 0.10% by mass of bis-2,2,6,6-tetramethyl-4-piperidyl sebacate and 0.3% by mass, of calcium stearate, based in each case on the propylene copolymer, is metered at 14.25 kg/h into a ZSK 27 Leistritz extruder, L/D=44, with side stream metering for pulverulent media and a decompression zone for vacuum devolatilization, temperature profile 20/200/200/200/200/200/200/200/200/200° C., melted and homogenized. Thereafter, the modified sodium montmorillonite according to Example 3 is metered via a metering apparatus for pulverulent media at 0.75 kg/h into the polyolefin melt in zone 4. After thorough homogenization, the mixture is devolatilized in the decompression zone, discharged and granulated. Specimens produced therefrom have a notched impact strength of 10 $kJ/m^2$ and a modulus of elasticity of 2250 MPa. Testing of the flame retardants according to UL 94 (1.6 mm) indicates classification in class V-0.

EXAMPLE 6

A mixture of propylene homopolymer (melt flow index 8.0 g/10 min at 230° C./2.16 kg), 20% by mass of ammonium polyphosphate, 5% by mass of pentaerythritol, 0.15% by mass of 2-tert-butyl-4,6-diisopropylphenol, 0.10% by mass of bis-2,2,6,6-tetramethyl-4-piperidyl sebacate and 0.3% by mass of calcium stearate, based in each case on the propylene homopolymer, is metered at 6.8 kg/h into a ZSK 27 Leistritz extruder, L/D=44, with side stream metering for pulverulent media and a decompression zone for vacuum devolatilization, temperature profile 20/215/215/215/215/215/215/215/215/215° C., melted and homogenized. Thereafter, modified inorganic particles according to Example 4 are metered via a metering apparatus for pulverulent media at 0.68 kg/h into the polyolefin melt in zone 4. After thorough homogenization, the mixture is let down in the decompression zone, devolatilized, discharged and granulated.

Specimens produced therefrom have a notched impact strength of 8 $kJ/m^2$ and a modulus of elasticity of 2450 MPa. Testing of the flame retardants according to UL 94 (1.6 mm) indicates classification in class V-0.

EXAMPLE 7

Preparation of the Laminating Resin Solution 35 kg of a 30% aqueous aldehdye solution comprising 9:1 formaldehyde/furfural, 8 kg of melamine, 2 kg of aniline and 2.5 kg of 2-(2-hydroxyethylamino)-4,6-diamino-1,3,5-triazine are introduced into a 150 liter stirred reactor having a reflux condenser and high-speed disperser, adjusted to pH 7.0 with sodium hydroxide solution and condensed at 80° C. with stirring over 35 min. After cooling to room temperature, 1.2 kg of modified inorganic particles according to Example 1 are added to the reaction mixture and stirring is effected for 45 min at 45° C.

Processing of the Aminoplast Solution with Dispersed Modified Inorganic Particles to Give Laminates For the production of the laminates, a decor paper (basis weight 80 $g/m^2$) and a kraft paper as core paper (basis weight 180 $g/m^2$) are impregnated at 25° C. with a laminating resin solution which contains 0.2% of 1:1 citric acid/phthalic acid as a curing agent, 5% by mass of modified inorganic particles 1% by mass of a wetting agent, and 1% by mass of a release agent. After drying in a through-circulation oven at 140° C. to an alignment of 7.2%, the decor paper contains 58% by mass of filled laminating resin, and the kraft paper contains 46% by mass of filled laminating resin. Two layers of the impregnated decor paper are then compressed with a layer of core paper in between in a laminating press with a pressure of 90 bar at 155° C. for 120 s.

In order to test the toughness, the subsequent deformability of the resulting laminate was investigated. When the laminate is bent around a 2.5 mm metal spindle heated to 160° C., no cracking of the laminate occurs.

The invention claimed is:

1. A modified inorganic particle having a layer structure, wherein the modified inorganic particle has a mean particle diameter of from 5 nm to 20,000 nm and an outer coat of aminoplasts in an amount of from 0.1 to 20% by mass, based on the mass of the inorganic particle, and an interlamellar content of from 20 to 5,000% by mass, based on the mass of the inorganic particle, of a mixture of from 50 to 98% by mass of one or more substantially polyfunctional $C_1$–$C_{30}$ amino compounds selected from the group consisting of melamine, melamine derivatives, urea, urea derivatives, guanidine, guanidine derivatives, cyanamide, dicyandiamide, sulfonamides, aniline and salts thereof and from 2 to 50% by mass of water.

2. The modified inorganic particle as claimed in claim 1, wherein the inorganic particle having a layer structure is selected from the group consisting of silicate, phosphate, arsenate, titanate, vanadate, niobate, molybdate, manganate and combinations thereof.

3. The modified inorganic particle as claimed in claim 1 or 2, wherein the aminoplasts are selected from the group consisting of melamine resins, urea resins, cyanamide resins, dicyandiamide resins, sulfonamide resins, guanamine resins, aniline resins and combinations thereof.

4. The modified inorganic particle as claimed in claim 3, wherein the melamine resins are polycondensates of melamine or melamine derivatives and $C_1$–$C_{10}$-aldehydes with a molar melamine or melamine derivative/$C_1$–$C_{10}$-aldehyde ratio of from 1:1 to 1:6 and the partial etherification products thereof with $C_1$–$C_{10}$-alcohols.

5. The modified inorganic particle as claimed in claim 1, wherein the melamine derivatives are selected from the group consisting of melamines, diaminomethyltriazines, or diaminophenyltriazines substituted by hydroxy-$C_1$–$C_{10}$-alkyl groups, by hydroxy-$C_1$–$C_4$-alkyl(oxa-$C_2$–$C_4$-alkyl)$_{1-5}$ groups and/or or by amino-$C_1$–$C_{12}$-alkyl groups, ammeline, ammelide, melem, melon, melam and combinations thereof.

6. The modified inorganic particle as claimed in claim 1, wherein the urea derivatives are selected from the group consisting of thiourea, and urea or thiourea substituted by $C_1$–$C_{10}$-alkyl groups, $C_6$–$C_{14}$-aryl groups, hydroxy-$C_1$–$C_{10}$-alkyl groups, hydroxy-$C_1$–$C_4$-alkyl(oxa-$C_2$–$C_4$-alkyl)$_{1-5}$ groups or amino-$C_1$–$C_{12}$-alkyl groups.

7. The modified inorganic particle as claimed in claim 1, 5 or 6, wherein the one or more polyfunctional $C_1$–$C_{30}$ amino compounds are salts with inorganic or organic anions.

8. The modified inorganic particle as claimed in claim 4, wherein the $C_1$–$C_{10}$-aldehydes are selected from the group consisting of formaldehyde, acetaldehyde, trimethylolacetaldehyde, acrolein, benzaldehyde, furfurol, glyoxal, glutaraldehyde, phthalaldehyde, terephthalaldehyde and combinations thereof.

9. A process for the preparation of modified inorganic particles having a layer structure, comprising:
homogenizing suspensions of inorganic particles having a layer structure in water or mixtures of from 5 to 99% by weight of water and from 95 to 1% by mass of $C_1$–$C_8$-alcohols, having a solids content of from 2 to 35% by mass, in a stirred reactor at from 20 to 100° C. and for a residence time of from 10 to 180 min with solutions or suspensions of polyfunctional $C_1$–$C_{30}$ amino compounds selected from the group consisting of melamine, melamine derivatives, urea, urea derivatives, guanidine, guanidine derivatives, cyanamide, dicyandiamide, sulfonamides, aniline and salts thereof in water or mixtures of from 5 to 99% by weight of water and from 95 to 1% by mass of $C_1$–$C_8$-alcohols, having a solids content of from 5 to 90% by mass, the amount by mass of the polyfunctional $C_1$–$C_{30}$ amino compounds being from 20 to 5,000% by mass, based on the mass of the anhydrous inorganic particles;
following the dispersion of the laden inorganic particles, optionally after the liquid phase has been partially separated off, introducing aminoplast prepolymers selected from the group consisting of melamine resins, urea resins, cyanamide resins, dicyandiamide resins, sulfonamide resins, guanamine resins and/or aniline resins having a number average molar mass of from 150 to 1,000, as a solution in water and/or in organic solvents or solvent mixtures having a resin content of from 30 to 98% by mass, and optionally from 0.1 to 2.0% by mass, based on the mass of the aminoplast prepolymers, of acidic catalysts at from 20 to 90° C. and reacting the aminoplast particles, the aminoplast content of the dispersion being from 0.1 to 20% by mass, based on the anhydrous inorganic particles, the solids content of the dispersion with regard to inorganic particles being from 0.5 to 35% by mass and the residence time being from 10 to 45 min; and thereafter drying the modified inorganic particles with removal of the liquid phase at from 20 to 180° C. and for a residence time of from 0.1 to 8 hours.

10. A process for the preparation of modified inorganic particles having a layer structure, comprising:
homogenizing suspensions of inorganic particles having a layer structure in water or mixtures of from 5 to 99% by weight of water and from 95 to 1% by mass of $C_1$–$C_8$-alcohols, having a solids content of from 2 to 35% by mass, in a stirred reactor at from 20 to 100° C. and for a residence time of from 10 to 180 minutes with solutions or suspensions of polyfunctional $C_1$–$C_{30}$ amino compounds selected from the group consisting of melamine, melamine derivatives, urea, urea derivatives, cyanamide, dicyandiamide, sulfonamides guanidine, guanidine derivatives, aniline and salts thereof in water or mixtures of from 5 to 99% by weight of water and from 95 to 1% by mass of $C_1$–$C_8$-alcohols, having a solids content of from 5 to 90% by mass,
the amount by mass of the polyfunctional $C_1$–$C_{30}$ amino compounds being from 20 to 5,000% by mass, based on the mass of the anhydrous inorganic particles;
following the dispersion of the laden inorganic particles, optionally after the liquid phase has been partially separated off, adding from 0.1 to 10% by mass, based on the mass of the anhydrous inorganic particles, of $C_1$–$C_{10}$-aldehydes as from 5 to 50% solutions in water or mixtures of from 5 to 99% by weight of water and from 1 to 95% by mass of $C_1$–$C_8$-alcohols, which optionally contain from 0.05 to 1% by mass, based on mass of the $C_1$–$C_{10}$-aldehydes, of acidic catalysts over the course of from 10 to 90 min at from 50 to 90° C.; and
thereafter drying the modified inorganic particles with removal of the liquid phase at 20 to 180° C. and for a residence time of from 0.1 to 8 hours.

11. The method for flameproofing plastic comprising incorporating into the plastic modified inorganic particles having a layer structure as claimed in claim 1.

12. A polyolefin comprising from 1 to 60% by mass, based on the mass of the polyolefin used, of modified inorganic particles having a layer structure as claimed in claim 1 and optionally, as further additives, a material selected from the group consisting of inorganic or organic salts, fillers, reinforcing materials, polymeric dispersants, assistants, polyhydric alcohols, and combinations thereof, wherein the inorganic or organic salts are salts having ammonium, alkylammonium, phosphonium, alkylphosphonium, arylphosphonium, alkali metal or alkaline earth metal cations or salts having phosphite, phosphate, phosphonate, silicate or borate anions, which may be contained in an amount of up to 25% by mass on the polyolefin,
the fillers or reinforcing materials are inorganic or organic fillers or fibers which may be contained in an amount of up to 40% by mass in the polyolefin,
the polymeric dispersants are water-soluble, water-dispersible or water-emulsifiable polymers, which may be present in an amount of up to 3% by mass in the polyolefin,
and the polyhydric alcohols are polyhydric alcohols selected from the group consisting of erythritol, pentaerythritol, pentitol, hexitol, and combinations thereof which may be contained in an amount of up to 15% by mass in the polyolefin.

13. A thermosetting plastic comprising from 2 to 80% by mass, based on the mass of the thermosetting plastic used, of modified inorganic particles having a layer structure as claimed in claim 1 and optionally, as further additives, a material selected from the group consisting of inorganic or organic salts, fillers, reinforcing materials, polymeric dispersants, assistants, polyhydric alcohols, and combinations thereof, wherein:

the inorganic or organic salts are salts having ammonium, alkylammonium, phosphonium, alkylphosphonium, arylphosphonium, alkali metal or alkaline earth metal cations or salts having phosphite, phosphate, phosphonate, silicate or borate anions, which may be contained in an amount of up to 60% by mass in the thermosetting plastic, the fillers or reinforcing materials are inorganic or organic fillers or fibers which may be contained in an amount of up to 70% by mass in the thermosetting plastic, the polymeric dispersants are water-soluble, water-dispersible or water-emulsifiable polymers which may be contained in an amount of up to 5% by mass in the thermosetting plastic and the polyhydric alcohols are polyhydric alcohols selected from the group consisting of erythritol, pentaerythritol, pentitol, hexitol, and combinations thereof which may be contained in an amount of up to 30% by mass in the thermosetting plastic.

14. A semifinished product or molding of a polyolefin or thermosetting plastic comprising modified inorganic particles having a layer structure and optionally further additives as claimed in claim 12 or 13 in a form selected from the group consisting of films, prepregs, fibers, sheets, pipes, coatings, hollow bodies, injection molded products and foams.

15. The modified inorganic particle as claimed in claim 1, wherein the inorganic particle comprises a sheet silicate selected from the group consisting of montmorillonite, bentonite, kaolinite, muscovite, hectorite, fluorohectorite, kanemite, revdite, grumantite, ilerite, saponite, beidelite, nontronite, stevensite, laponite, taneolite, vermiculite, halloysite, volkonskoite, magadite, rectorite, halloysite, kenyaite, sauconite and borofluorophlogophite, and a synthetic sheet silicate.

16. The modified inorganic particle as claimed in claim 1, wherein the inorganic particle is a sheet silicate having exchange cations selected from the group consisting of alkali metal, alkaline earth metal, aluminum, iron and manganese cations.

17. The modified inorganic particle as claimed in claim 3, wherein the melamine resins are melamine derivatives selected from the group consisting of melamines, diaminomethyltriazines or diaminophenyltriazines substituted by hydroxy-$C_1$–$C_{10}$-alkyl groups, by hydroxy-$C_1$–$C_4$-alkyl (oxa-$C_2$–$C_4$-alkyl)$_{1-5}$ groups or by amino-$C_1$–$C_2$-alkyl groups, ammeline, ammelide, melem, melon, melam, benzoguanamine, acetoguanamine, tetramethoxymethylbenzoguanamine, caprinoguanamine and butyroguanamine.

18. The modified inorganic particle as claimed in claim 3, wherein the melamine derivative is selected from the group consisting of 2-(2-hydroxyethylamino)-4,6-diamino-1,3,5-triazine, 2-(5-hydroxy-3-oxapentylamino)-4,6-diamino-1,3,5-triazine, and 2,4,6-tris(6-aminohexylamino)-1,3,5-triazine.

19. The modified inorganic particle as claimed in claim 4, wherein the $C_1$–$C_{10}$ aldehydes are selected from the group consisting of formaldehyde, acetaldehyde, trimethylolacetaldehyde, acrolein, furfurol, glyoxal, and glutaraldehyde.

20. The modified inorganic particle as claimed in claim 1, wherein the melamine derivatives are selected from the group consisting of 2-(2-hydroxyethylamino)-4,6-diamino-1,3,5-triazine, 2-(5-hydroxy-3-oxapentylamino)-4,6 -diamino-1,3,5-triazine, 2,4,6-tris(6-aminohexylamino)-1,3,5-triazine, and 2,4-(di-5-hydroxy-3-oxapentylamino)-6-methyl-1,3,5-triazine.

21. The method according to claim 11, wherein the modified inorganic particles are in combination with inorganic or organic salts having ammonium, alkylammonium, arylammonium, phosphonium, alkylphosphonium, arylphosphonium, alkali metal or alkaline earth metal cations or phosphate, phosphite, phosphonate, silicate or borate anions, or with polyhydric alcohols selected from the group consisting of erythritol, pentaerythritol, pentitol and hexitol.

22. A method for increasing the scratch resistance and UV stability and improving the barrier properties of plastics and plastics laminates comprising incorporating into a plastic or plastic laminate modified inorganic particles having a larger structure as claimed in claim 1.

23. The method according to claim 20, wherein the modified inorganic particles are in combination with inorganic or organic salts having ammonium, alkylammonium, arylammonium, phosphonium, alkylphosphonium, arylphosphonium, alkali metal or alkaline earth metal cations or phosphate, phosphite, phosphonate, silicate and/or or borate anions, or with polyhydric alcohols selected from the group consisting of erythritol, pentaerythritol, pentitol and hexitol.

* * * * *